United States Patent [19]

Ikawa

[11] 4,241,369
[45] Dec. 23, 1980

[54] ELECTRICAL POWER SOURCE FOR AN ELECTRONIC FLASH UNIT

[75] Inventor: Kazuo Ikawa, Tokyo, Japan

[73] Assignee: Canon Kabushiki Kaisha, Tokyo, Japan

[21] Appl. No.: 47,899

[22] Filed: Jun. 12, 1979

[30] Foreign Application Priority Data

Jun. 26, 1978 [JP] Japan .................. 53-77153

[51] Int. Cl.³ .............................. H02H 3/22
[52] U.S. Cl. ........................ 361/8; 361/13; 307/130; 354/127
[58] Field of Search ........... 307/125, 131, 130, 150, 307/157; 361/5, 6, 7, 8, 9, 13; 354/60 F, 127; 200/10, 144 R-362.5; 337/110; 315/240, 241 P

[56] References Cited

U.S. PATENT DOCUMENTS

| | | | |
|---|---|---|---|
| 3,569,779 | 3/1971 | Luursema | 307/150 |
| 3,736,466 | 5/1973 | Fox | 361/8 |
| 4,156,565 | 5/1979 | Harrison | 354/60 F |

FOREIGN PATENT DOCUMENTS 45-18501  6/1970 Japan .................. 361/13

*Primary Examiner*—L. T. Hix
*Assistant Examiner*—S. D. Schreyer
*Attorney, Agent, or Firm*—Toren, McGeady and Stanger

[57] ABSTRACT

An electrical power supply for an electronic flash unit with a main capacitor charged by a current flowing from a direct-current source through an electrical power source switch to the main capacitor is disclosed. The electrical power source has a semi-conductor switch connected in the charge path to the main capacitor and a detector, arranged to detect whether or not an aerial discharge is produced between the contacts of said switch upon opening of the electrical power source switch, and, upon occurrence of a discharge, to produce a signal. The semi-conductor switch is opened in response to the signal to stop charging of the main capacitor immediately.

7 Claims, 2 Drawing Figures

ELECTRICAL POWER SOURCE FOR AN ELECTRONIC FLASH UNIT

BACKGROUND OF THE INVENTION

This invention relates to an electrical power supply for a flash unit using a direct-current high voltage electrical power source such as a layer-built cell.

An electrical power supply circuit for a flash unit using a direct-current high voltage (100-500 volts) electrical power source is conventionally constructed as shown in FIG. 1. Here, two power switches 2 and 2' when turned on allow for charging a main capacitor 5 through a resistor 3 and a discharge preventing diode 4. In such as conventional electrical power supply circuit, the electrical power source switches use mechanical contacts. It often happens that the switches 2 and 2' are opened when the main capacitor 5 is not yet charged to a sufficient level. When that occurs, the application of a high voltage across the contacts of the switches 2 and 2' may cause an aerial discharge between the contacts. Thus the electrical power source is then not actually cut off but continues charging the main capacitor 5. If the aerial discharge continues for a long time, there is a great possibility of damaging the contacts due to the heat of the discharge.

The problem has so far been solved by lengthening the distance between the contacts of the electrical power source switch so that even when a high voltage is applied across the contacts, no aerial discharge is produced. This solution gives rise to an alternate problem that the bulk and size of the electrical power source switch in the electrical power source circuit becomes much larger.

SUMMARY OF THE INVENTION

An object of the present invention is to provide an electrical power supply circuit capable of cutting off the electrical power simply and immediately, and of preventing damage of the contacts of the electrical power switch.

Another object of the present invention is to provide an electrical power supply circuit which solves these problems electrically.

Other objects of the present invention will become apparent from the following detailed description of preferred embodiments thereof.

DESCRIPTION OF THE PREFERRED EMBODIMENTS

Figure 1:
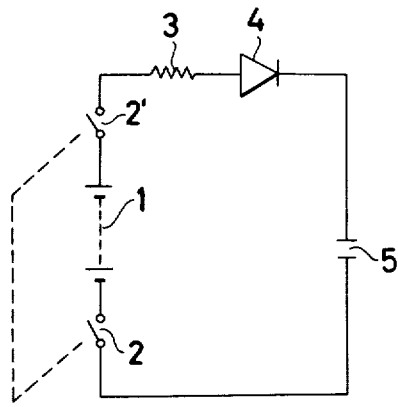
FIG. 1 is an electrical circuit diagram showing a prior art electrical power supply circuit for a flash unit.
Figure 2:
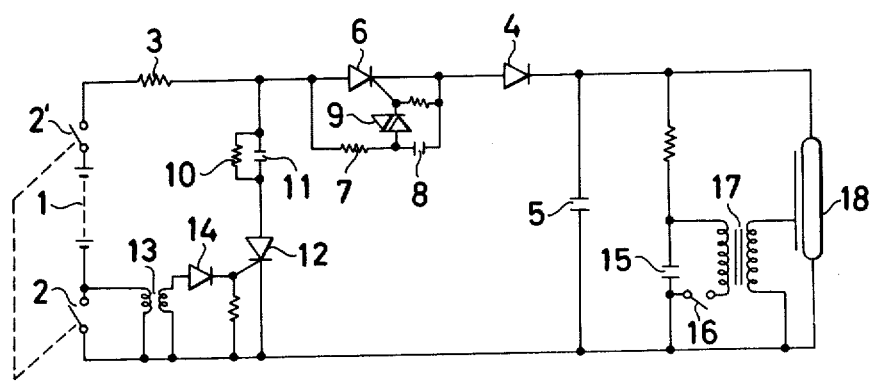
FIG. 2 is an electrical circuit diagram showing one embodiment of an electrical power supply circuit for a flash unit according to the present invention.

In FIG. 2, 1 is a direct-current high voltage electrical power source to detect whether or not an aerial discharge is produced between the contacts of said switch; electrical power supply or source switches 2 and 2' having mechanical contacts that coact with each other. A resistor 3, diode 4 and main capacitor 5 respectively correspond to like members in FIG. 1; A semi-conductor switching element in the form of a thyristor 6 is connected in a charging path from the electrical power source 1 to the main capacitor 5. A resistor 7 forms a series-connected circuit together with a capacitor 8, the series-connected circuit being connected parallel to the above described thyristor 6. A two-terminal switching element such as a diac 9 is connected between the gate of the thyristor 6 and the junction of the resistor 7 and capacitor 8 in the series-connected circuit, and constitutes a trigger circuit for the thyristor. A transformer 13 has its primary winding connected parallel to the electrical power source switch 2, while a diode 14 is connected between the secondary coil of the transformer 13 and the gate of a thyristor 12. The diode 14 forms an aerial discharge detecting circuit and a trigger circuit for the thyristor 12 together with the transformer 13. A high resistance 10 and a capacitor 11 are connected in parallel and to the anode of the thyristor 6, and serve a control function for turning off the thyristor 6. A and trigger capacitor 15, a synchro-switch 16 and a trigger transformer 17 constitute a known trigger circuit for a discharge tube 18.

The operation of the circuit of FIG. 2 is as follows: When the electrical power source switches 2 and 2' are closed, a current from the electrical power source 1 flows through the resistors 3 and 7 to the capacitor 8, thereby charging the capacitor 8. As the charging of said capacitor 8 proceeds, the voltage across the capacitor 8. When the latter voltage exceeds the breakover voltage for the diac 9 it serves to actuate the diac 9 and driven it into conduction. Then the charge on the capacitor 8 is discharged through the gate-cathode path of the thyristor 6. Hence, the thyristor 6 is turned on to establish a charge path to the main capacitor 5, so that a current from the electrical power source 1 flows through the resistor 3, thyristor 6 and diode 4 to charge the main capacitor 5. Now assuming that the main capacitor 5 is not fully charged, when the electrical power switches 2 and 2' are turned off, an aerial discharge is instantaneously produced between the contacts of each of the switches 2 and 2'. This discharge would otherwise survive to effect a continuance of charging of the main capacitor 5 as described. In this embodiment, however, as soon as the aerial discharge occurs, the thyristor 6 is turned off so that the charge supply to the main capacitor 5 is cut off to stop the aerial discharge at the electrical power switches 2 and 2'.

In more detail above, when an aerial discharge is produced between the contacts of the switch 2', a voltage drop occurs between the contacts of the switch 2. For this reason, a current flows through the primary coil of the transformer 13, and a positive voltage is then caused, by the transformer, at the gate of the thyristor 12. Because the thyristor 12 is turned on, the potential at the anode of the thyristor 6 is lowered with the result that said thyristor 6 is reverse-biased and turned off. Thus, the charge path to the main capacitor 5 is broken. Although at this time, the thyristor 12 remains ON, the capacitor 11 charges because the resistance of the resistor 10 is high. This causes the current flowing through the thyristor 12 to fall below a holding level therefor. Thus, said thyristor 12 is turned off soon after it is turned on, and the electrical power source 1 is entirely isolated so it can effect no more aerial discharge across the switches 2 and 2'.

It should be noted that the change of the thyristor 6 to non-conduction does not cause recharging of the capacitor 8, because the aerial discharge stops before the voltage across the capacitor 8 reaches the breakover voltage of the diac 9. Thus, after the electrical power source switches 2 and 2' are opened, the charging of the main capacitor 5 and the aerial discharge are immediately terminated.

The foregoing discussion is directed to the case when the electrical power source switch is opened at an intermediate time during the charging of the main capacitor 5. Alternately when the electrical power source switch is opened after the main capacitor is fully charged, because of the impossibility of occurrence of an aerial discharge across the contacts of the electrical power source switch, the termination of charging of the main capacitor is controlled in a manner known in the art, as in a conventional flash unit.

It will be seen from the foregoing detailed description that the present invention contemplates the use of a semi-conductor switch in constructing an electrical power supply circuit for a flash unit so that upon detection of an aerial discharge across the contacts of the mechanical switch of the electrical power supply, the semi-conductor switch connected between the electrical power source and the storage capacitor is turned off to avoid the objectionable influence of the aerial discharge on the mechanical switch without the necessity of lengthening the distance between the contacts. This offers many advantages for flash photography.

What is claimed is:

1. An electrical power supply apparatus for an electronic flash unit having electrical energy storage means and a charging circuit for the storage means, comprising:
   an electrical power source switch having mechanical contacts and connected in the charging circuit for said storage means;
   detecting means connected to said electrical power source switch to detect an aerial discharge produced across the contacts of said switch upon opening of said electrical power source switch and, upon occurrence of said discharge, to produce a signal; and
   a semi-conductor switch connected in the charging circuit for said storage means and arranged to be opened in response to said signal.

2. An electrical power source apparatus according to claim 1, wherein said semi-conductor switch is connected in series between said electrical power source switch and said storage means.

3. An electrical power source apparatus according to claim 1, wherein said detecting means is connected across the contacts of said electrical power source switch to detect a voltage drop across the contacts due to the aerial discharge.

4. An electrical power source apparatus according to claim 1, wherein said detecting means includes:
   (a) a transformer having a primary coil connected between the contacts of said electrical power source switch; and
   (b) a switching element having an input terminal connected to the output terminal of said transformer and closeable in response to the output signal from said transformer.

5. An electrical power source apparatus according to claim 4, wherein said switching element and said semiconductor switch each have an anode electrode, said anode electrodes being connected to each other so as to drop the potential of the anode electrode of said semiconductor switch in response to the output signal from said transformer.

6. An electrical power source apparatus according to claim 5, wherein said switching element includes a thyristor.

7. A flash unit, comprising:
   a flsh tube,
   a storage capacitor,
   a flash discharge circuit,
   a mechanical switch,
   a semiconductor switch,
   a detector for sensing a voltage charge and producing a signal,
   a control circuit connecting said flash discharge circuit across the tube,
   a second control circuit connecting said mechanical switch and said semi-conductor switch in series and connecting said detector across the mechanical switch and to the semi-conductor switch for turning off the semi-conductor switch in response to a discharge across the mechanical switch.

* * * * *